(12) United States Patent
Dubay et al.

(10) Patent No.: US 8,783,128 B2
(45) Date of Patent: Jul. 22, 2014

(54) STEERING COLUMN MANUFACTURING MACHINE AND METHOD OF MANUFACTURING A STEERING COLUMN

(75) Inventors: Robert W. Dubay, Saginaw, MI (US); David E. Witucki, Bay City, MI (US); Dennis G. McDonagh, Olean, NY (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/307,201

(22) Filed: Nov. 30, 2011

(65) Prior Publication Data

US 2012/0067160 A1    Mar. 22, 2012

Related U.S. Application Data

(62) Division of application No. 11/897,236, filed on Aug. 29, 2007, now Pat. No. 8,096,036.

(51) Int. Cl.
 *B62D 1/16* (2006.01)
(52) U.S. Cl.
 USPC ............. 74/493; 29/434; 29/447; 280/775; 384/29; 384/42
(58) Field of Classification Search
 USPC ......... 74/492, 493; 280/775, 777; 384/20, 21, 384/29, 42; 464/162; 29/434, 447
 See application file for complete search history.

(56) References Cited

U.S. PATENT DOCUMENTS

| 2,889,582 | A |   | 6/1959  | Cooper              |         |
| 3,482,653 | A | * | 12/1969 | Nishimura et al.    | 74/492  |
| 3,703,105 | A | * | 11/1972 | Milton et al.       | 74/492  |
| 4,598,857 | A |   | 7/1986  | Matsui              |         |
| 4,667,530 | A |   | 5/1987  | Mettler et al.      |         |
| 4,774,851 | A |   | 10/1988 | Iwanami et al.      |         |
| 4,972,732 | A |   | 11/1990 | Venable et al.      |         |
| 5,080,334 | A |   | 1/1992  | Mihara et al.       |         |
| 5,086,661 | A |   | 2/1992  | Hancock             |         |
| 5,243,874 | A |   | 9/1993  | Wolfe et al.        |         |
| 5,348,345 | A | * | 9/1994  | Dykema et al.       | 280/777 |
| 5,383,811 | A |   | 1/1995  | Campbell et al.     |         |
| 5,460,574 | A |   | 10/1995 | Hobaugh             |         |
| 5,507,203 | A |   | 4/1996  | Audibert et al.     |         |
| 5,560,650 | A |   | 10/1996 | Woycik et al.       |         |
| 5,590,565 | A |   | 1/1997  | Palfenier et al.    |         |
| 5,623,756 | A |   | 4/1997  | Yanagidate et al.   |         |
| 5,640,884 | A |   | 6/1997  | Fujiu et al.        |         |
| 5,722,300 | A | * | 3/1998  | Burkhard et al.     | 74/493  |
| 6,109,652 | A |   | 8/2000  | Kim et al.          |         |
| 6,149,526 | A |   | 11/2000 | Boersma et al.      |         |
| 6,223,619 | B1|   | 5/2001  | Shibata et al.      |         |
| 6,254,131 | B1|   | 7/2001  | Link                |         |
| 6,273,468 | B1|   | 8/2001  | Bohner et al.       |         |
| 6,343,993 | B1|   | 2/2002  | Duval et al.        |         |
| 6,389,923 | B1|   | 5/2002  | Barton et al.       |         |

(Continued)

*Primary Examiner* — William C Joyce
(74) *Attorney, Agent, or Firm* — Cantor Colburn LLP

(57) ABSTRACT

A steering column assembly is provided. The assembly includes an outer jacket, an inner jacket telescopingly disposed within the outer jacket for movement along a longitudinal axis with a cavity defined between the inner and outer jackets. A bushing is radially disposed about the inner jacket within the cavity between the inner and outer jackets. The bushing includes at least one tab engaging the inner jacket to interconnect the bushing to the inner jacket and includes at least one radially projecting pad engaging the outer jacket to frictionally interconnect the bushing to the outer jacket for interlocking the inner and outer jackets.

10 Claims, 4 Drawing Sheets

(56) References Cited

U.S. PATENT DOCUMENTS

| | | |
|---|---|---|
| 6,729,648 B2 | 5/2004 | Ulintz |
| 6,733,039 B2 | 5/2004 | Honda et al. |
| 6,754,944 B2 | 6/2004 | Barton et al. |
| 6,854,765 B2 * | 2/2005 | Heinzman et al. ............ 280/776 |
| 6,865,791 B2 | 3/2005 | Cook et al. |
| 6,892,602 B2 | 5/2005 | Hirschfeld et al. |
| 6,922,882 B2 | 8/2005 | Shah et al. |
| 7,022,423 B2 | 4/2006 | Greiner et al. |
| 7,051,523 B2 | 5/2006 | Kerchner |
| 7,784,830 B2 * | 8/2010 | Ulintz ............................ 280/775 |
| 2005/0200111 A1 | 9/2005 | Cymbal et al. |
| 2005/0262960 A1 | 12/2005 | Cymbal et al. |
| 2006/0290127 A1 | 12/2006 | Cymbal et al. |
| 2007/0113701 A1 | 5/2007 | Streng et al. |
| 2007/0151392 A1 * | 7/2007 | Oshita et al. .................... 74/493 |

* cited by examiner

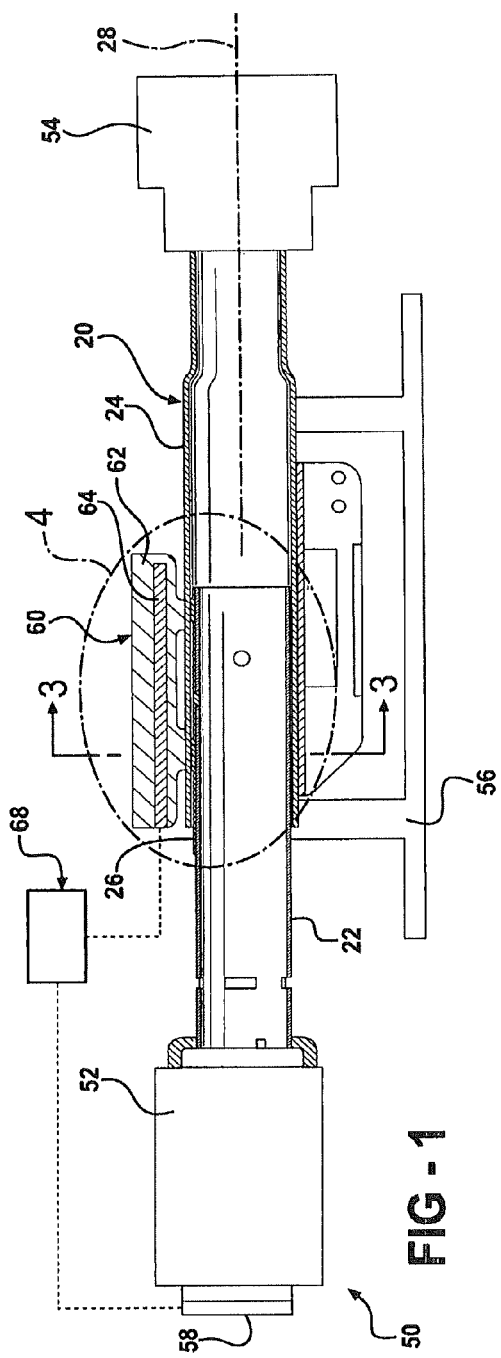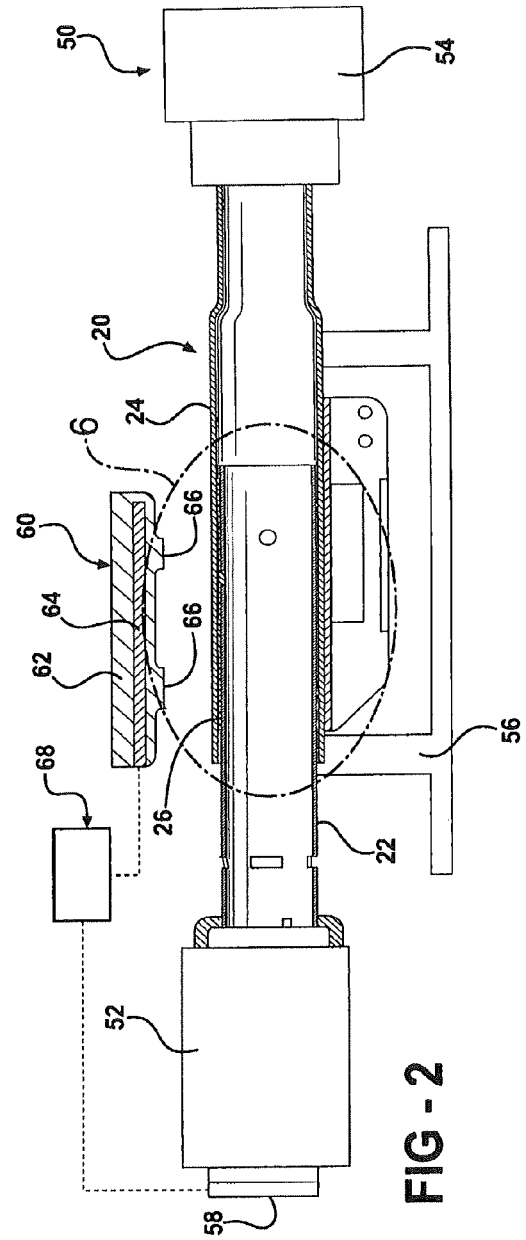

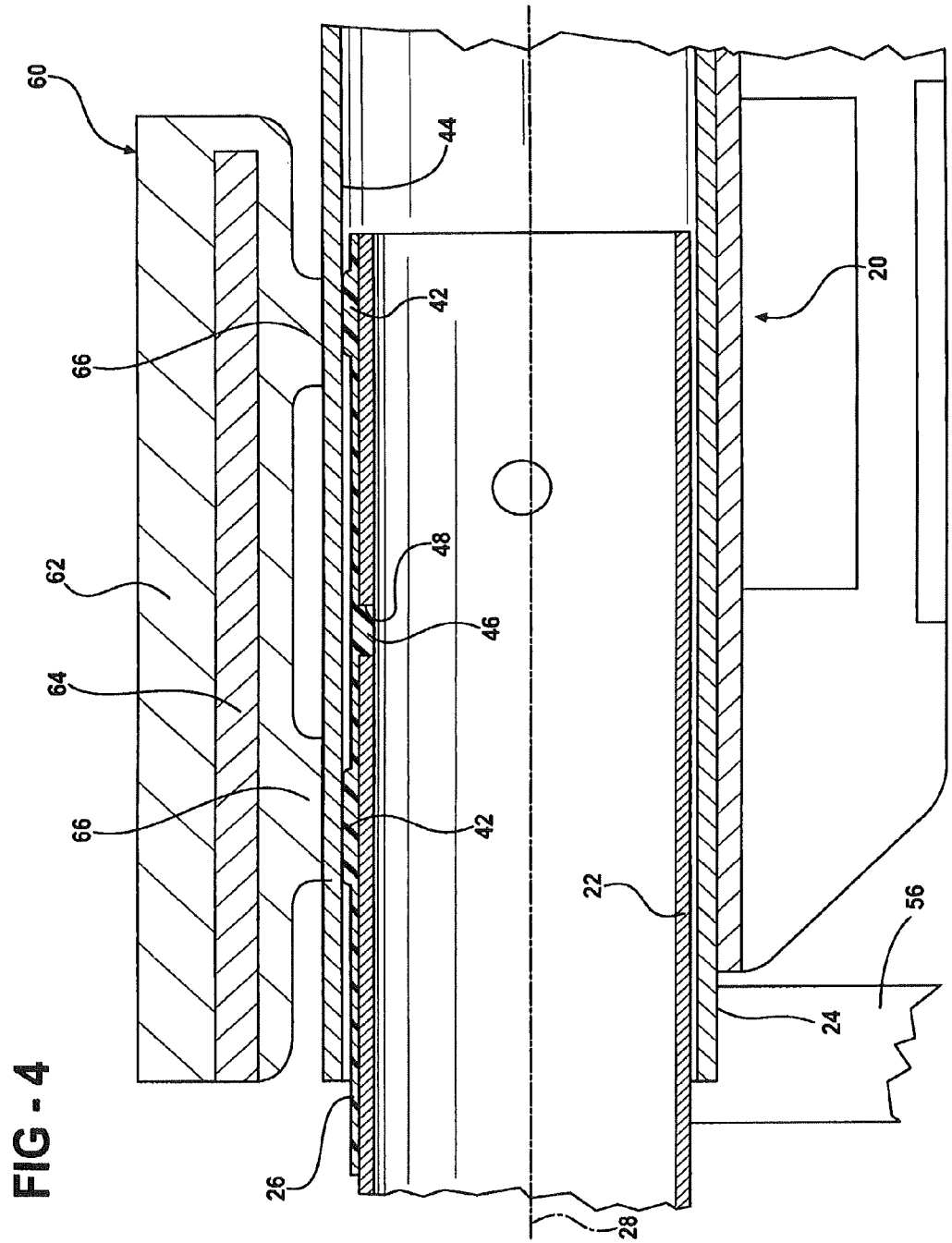

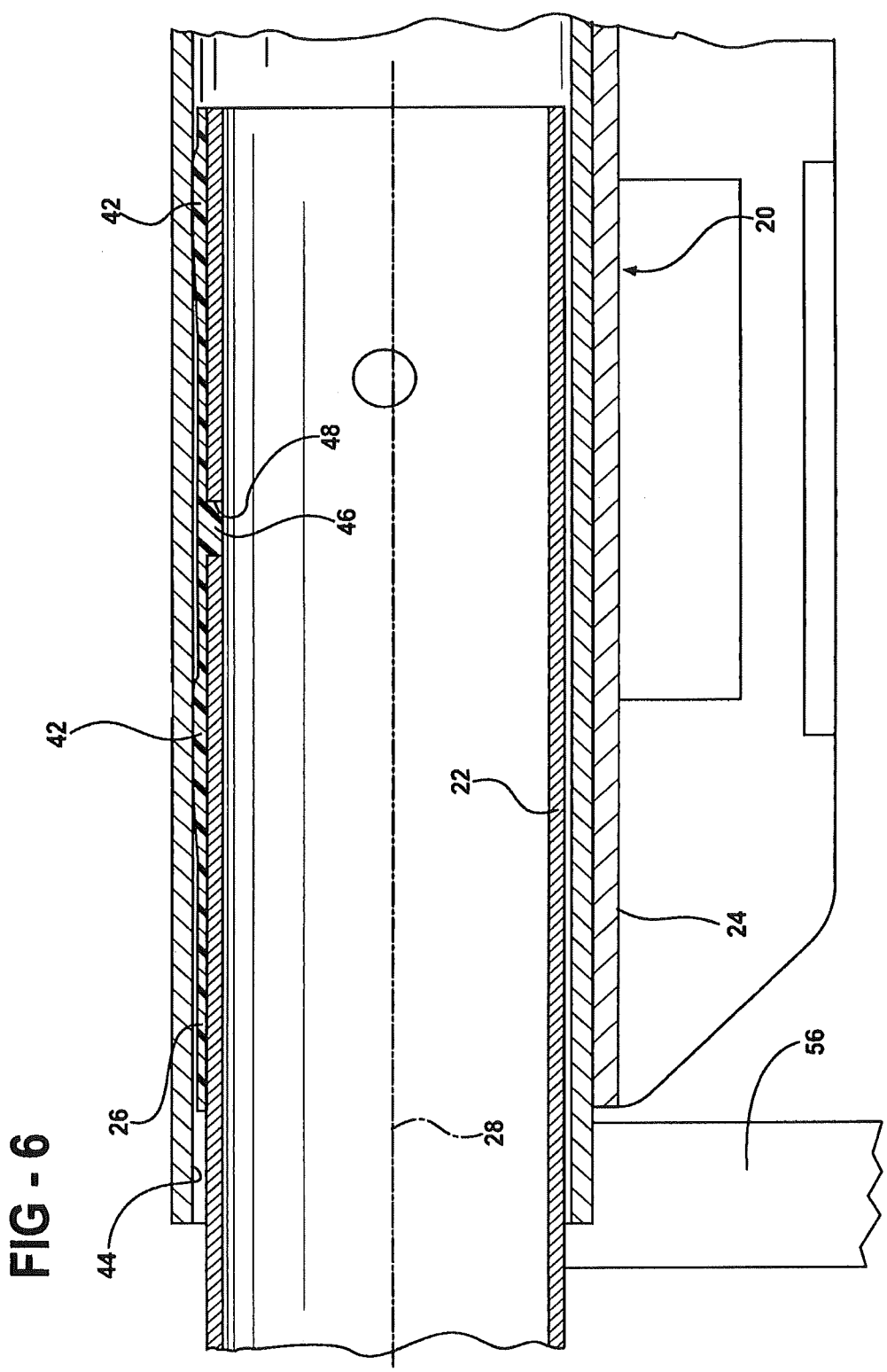

STEERING COLUMN MANUFACTURING MACHINE AND METHOD OF MANUFACTURING A STEERING COLUMN

CROSS-REFERENCES TO RELATED APPLICATIONS

This application is a Divisional Application of U.S. patent application Ser. No. 11/897,236, filed Aug. 29, 2007 which is incorporated herein, by reference, in its entirety.

FIELD OF THE INVENTION

The present invention relates to a machine for manufacturing a steering column and more particularly to a method of manufacturing a steering column assembly.

BACKGROUND

Current production telescoping steering columns traditionally use an injection molded plastic telescoping bushing, i.e. telebushing that once assembled between the column jackets is over-molded with a plastic injection process. Secondary processes such as "wiping" the jackets may also be performed to provide consistent telescoping loads. This over-mold process functions to take-up tolerance variations between the jackets, thus eliminating lash between the components. Unfortunately, the over-mold injection machines for this process require significant capital investment. Moreover, the process of "wiping" jackets to achieve consistent telescoping loads is expensive and labor intensive.

Accordingly, it would be desirable to develop a manufacturing machine and a method of manufacturing a steering column that overcame the deficiencies of the prior art while taking-up the necessary tolerance variations.

SUMMARY OF THE INVENTION

The present invention provides a method of manufacturing a steering column assembly having a first jacket and a second jacket with a bushing between the first and second jackets. The method utilizes a manufacturing machine having a loadable member, a fixed member, and a thermal fixture. The method comprises the steps of: assembling the first jacket to the second jacket with the bushing located radially between the first and second jackets to interlock the first and second jackets and prevent axial movement between the first and second jackets; loadable member to apply an axial force to the first jacket; heating the thermal fixture of the manufacturing machine; and melting the bushing until the first jacket moves axially relative to the second jacket.

The present invention also provides the steering column assembly and manufacturing machine for manufacturing the steering column having the first jacket in telescopic relation to the second jacket with the bushing located between the first and second jackets. The manufacturing machine comprises a loadable first member for releasable connection to the first jacket and a second member for releasable connection to the second jacket and axially opposing the first member. A thermal fixture is constructed and arranged to be heated for heating of the bushing through one of the first and second jackets.

Accordingly, the present invention includes a method and an associated manufacturing machine for manufacturing a steering column, that melts a bushing to thermally size the bushing and thus provide a consistent operation load between the inner and outer jackets when moving between extended and retracted positions while avoiding the deficiencies of the prior art.

BRIEF DESCRIPTION OF THE DRAWINGS

These and other objects, features and advantages of this invention will be apparent from the following detailed description, appended claims, and accompanying drawings in which:

FIG. 1 is a cross section of a steering column manufacturing machine embodying the present invention and in a preloaded state;

FIG. 2 is a cross section of the steering column manufacturing machine in an unloaded state;

FIG. 4 is an enlarged cross section of the steering column manufacturing machine taken from circle 4 of FIG. 1;

FIG. 6 is an enlarged cross section of the steering column manufacturing machine taken from circle 6 of FIG. 2.

DETAILED DESCRIPTION

Figure 3:
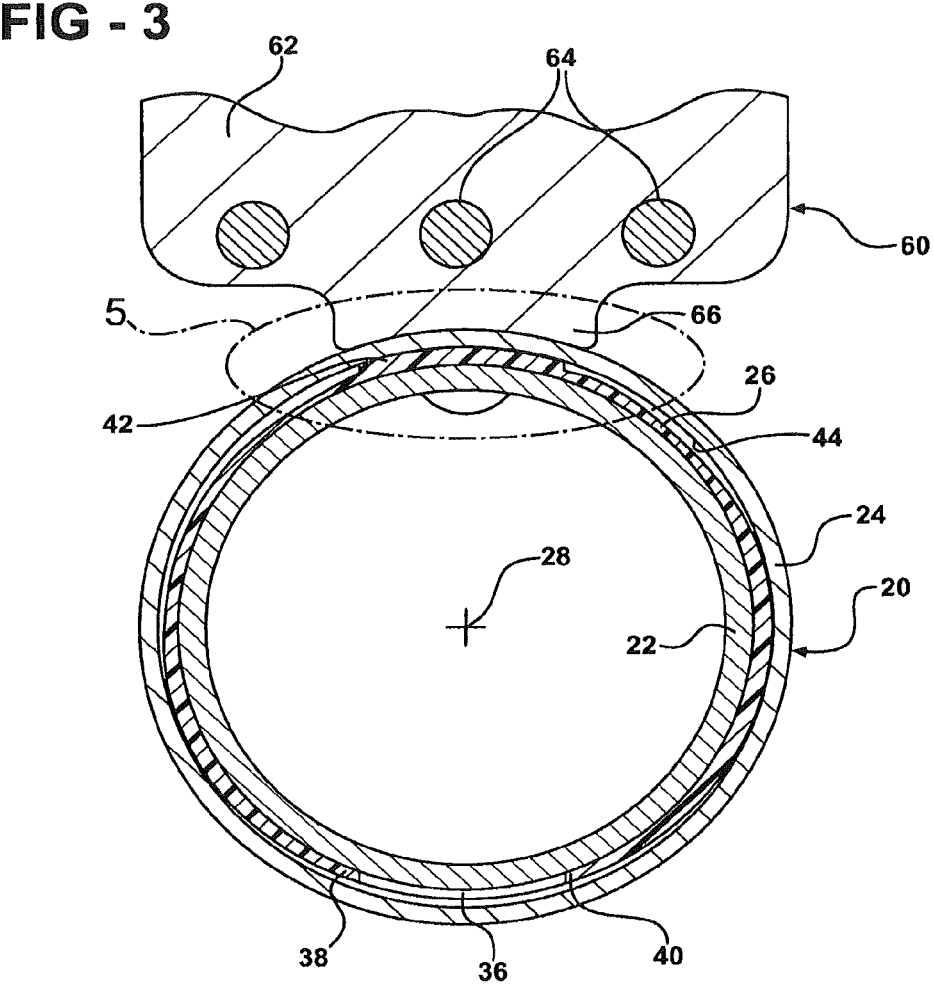
FIG. 3 is a cross section of the steering column manufacturing machine taken along line 3-3 of FIG. 1.

Referring to the Figures, wherein like numerals indicate like or corresponding parts, a steering column assembly is generally shown at 20 in FIGS. 1 and 4. The steering column assembly 20 has an inner or first jacket 22, an outer or second jacket 24 and a bushing 26 located between the inner and outer jackets 22, 24. Preferably, the inner and outer jackets 22, 24 are tubular in shape with the inner jacket 22 telescopingly disposed within the outer jacket 24 for movement along a longitudinal axis or centerline 28. A cavity is defined between the inner and outer jackets 22, 24.

As also shown in FIG. 3, the bushing 26 is preferably a telebushing that is radially disposed about the inner jacket 22 within the cavity between the inner and outer jackets 22, 24. The bushing 26 provides a substantially consistent load during telescopic movement of the jackets 22, 24 between an extended position and a retracted position. The bushing 26 is preferably tubular and split longitudinally to form a gap 36 circumferentially between two distal ends 38, 40 of the bushing 26. The gap 36 assists in the snug fit of the bushing radially between the jackets 22, 24.

The bushing 26 includes at least one tab 46 engaging the inner jacket 22 to interconnect the bushing 26 to the inner jacket 22 to prevent relative axial and rotational movement therebetween. The inner jacket 22 preferably includes a hole 48 for accepting the tab 46 of the bushing 26. The snap fit of the tab 46 in the hole 48 axially and circumferentially aligns the bushing 26 with the jackets 22, 24.

Figure 5:
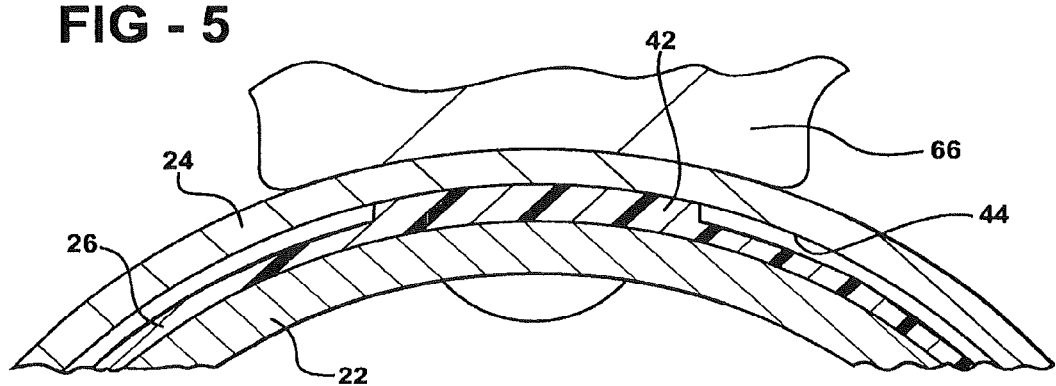
FIG. 5 is an enlarged cross section of the steering column manufacturing machine taken from circle 5 of FIG. 3.

As also shown in FIG. 5, the bushing 26 also includes at least one radially projecting pad 42, preferably a plurality of pads 42, engaging the outer jacket 24 to frictionally interconnect the bushing 26 to the outer jacket 24. In the embodiment illustrated, diametrically opposed to the gap 36 are two axially spaced pads 42 of the bushing 26 that project radially outward and press directly against a cylindrical inner surface 44 of the outer jacket 24. Additional pads 42 are circumferentially spaced about the jackets 22,24 as necessary. It should be appreciated that any number of pads 42 may be axially and/or circumferentially spaced about the jackets 22, 24. Welds in the outer jacket 24, for attachment of brackets, etc., often tend to locally deform the outer jacket 24 of the weld sites. It is therefore desirable that the pads 42 be spaced from the weld sites so as to not affect the stroke performance of the inner jacket.

The bushing 26 initially interlocks the inner and outer jackets 22,24 and prevents axial movement between the inner and outer jackets 22,24. As discussed in greater detail below, the pads 42 are meltable for thermally sizing the bushing 26 to allow relative movement between the inner and outer jackets 22,24 and to uniformly load the inner and outer jackets 22,24 during telescoping movement of the steering column assembly 20. In the preferred embodiment, the bushing 26 includes an inner surface and an opposing outer surface with the tab 46 projecting inwardly from the inner surface and the pad 42 projecting outwardly from the outer surface.

A steering column manufacturing machine 50 is provided for manufacturing the steering column assembly 20 having the jackets 22,24. The machine 50 has a loadable first member or cylinder 52 for releasable connection to the first or inner jacket 22. The machine 50 also has a rigidly fixed second member 54 for releasable connection to the second or outer jacket 24. The second member 54 is axially opposed to the first member 52. A bracket 56 of the machine 50 is contoured in a concave fashion to accept and secure a cylindrical shape of the outer jacket 24.

The first member 52 may be an air or hydraulic cylinder or may be a ball screw apparatus with a servo. The first member 52 includes a load cell 58 for setting and controlling the first member 52 to the desired operation load. Because operation of the machine 50 is generally compressive (i.e. the first member 52 moves toward the second member 54) attachment of distal ends of the jackets 22, 24 to the respective first and second members 52, 54 does not require clamping engagement or separate fasteners. Instead, each member 52, 54 is contoured and/or has a recess sized to snugly fit the ends of the respective jackets 22, 24.

A thermal fixture 60 of the machine 50 is constructed and arranged to be heated for heating the bushing 26 through one of the first and second jackets 22,24. The bracket 56 orientates the steering column assembly 20 diametrically opposed to the thermal fixture 60. The thermal fixture 60 has a housing 62 for direct contact with one of the first and second jackets 22,24 and at least one, preferably a plurality, of electric heating elements 64 contained inside the housing 62. Preferably and integral to the housing 62 are two inverted platforms 66. The platforms 66 are spaced axially apart from one another by a distance that is substantially equal to the spacing of the pads 42 to be heated. Each platform 66 therefore heats a respective pad 42. A controller 68 of the machine 50 preloads the first member 52 and moves the fixture 60 and the platforms 66 between a pre-staged state and a heating state. In the heating state, the platforms 66 are directly against an outer surface of one of the jackets 22,24, preferably the outer jacket 24, when heating the bushing 26 and radially away from the jackets 22,24 when not heating. Preferably, the first member 52 is preloaded when the thermal fixture 60 is in the heating state.

As also shown in FIG. 6, the steering column manufacturing machine 50 manufactures the steering column assembly 20 by thermally sizing the bushing 26 thus providing a consistent operation load or force between the inner and outer jackets 22, 24 when moving between the extended and retracted positions. During fabrication of the steering column assembly 20 and operation of the machine 50, the first jacket 22 is assembled to the second jacket 24 with the bushing 26 located radially between the jackets 22,24 to initially interlock the jackets 22,24 and prevent axial movement between the jackets 22,24. In particular, the bushing 26 is slid over the inner jacket 22 until the tab 46 snap fits into the hole 48 of the inner jacket 22 assuring that the bushing 26 is properly aligned. An axial frictional threshold force is then applied to the jackets 22, 24 forcing the inner jacket 22 into the outer jacket 24 thereby biasing the interference pads 42 tightly against the inner surface 44 of the outer jacket 24. This frictional threshold force is greater than a designed or operational force of the steering column assembly 20 during normal operation. The operational force is generally that axial force required to telescope the steering column assembly 20 between the retracted position and the extended position.

The steering column assembly 20 is then placed in the machine 50 with a distal end of the first or inner jacket 22 preferably releasably connected to the loadable member 52 and a distal end of the second or outer jacket 24 releasably connected to the fixed member 54 of the machine 50. The loadable member 52 is then axially loaded with the operational force and in a direction toward the fixed member 54 by the controller 68 to apply an axial force to the first jacket. Once the steering assembly column 20 is properly seated to the bracket 56 and members 52, 54, the controller 68 moves the thermal fixture 60 from the pre-staged state 72, where the elements 66 are spaced radially outward from the outer jacket 24, and to the heating state 70 where the elements 66 are, preferably, in direct contact with the outer surface of the outer jacket 24.

When in the heating state, the controller 68 energizes the heating elements 64 (if not continuously energized) to heat the thermal fixture 60. In the heating state, thermal conduction occurs to heat through the jacket 24 and melt the bushing 26 until the first jacket 22 moves axially relative to the second jacket 24. As mentioned above, the axial load is equal to the normal operational force. Hence, when the axial movement of the jackets 22,24 occurs, the bushing 26 has melted to the preferred size to ensure proper operational movement of the jackets 22,24. Preferably, the jackets 22, 24 are formed of a metallic material capable of transmitting heat and the bushing 26 is formed of a self-lubricating plastic material with a melting point generally compatible with the heating fixture 60. Even more preferably, the melting of the bushing 26 further includes the step of migrating the melted bushing 26 about the jackets 22,24 to thermally size the bushing 26 such that the jackets 22,24 are uniformly loaded during telescoping movement of the steering column assembly 20. The step of melting the bushing 26 is further defined as melting the pads 42 directly through the outer jacket 24. In the most preferred embodiment, the thermal fixture 60 is aligned with the pads 42 to be heated for adequately melting these pads 42 of the bushing 26.

When a portion of the pads 42 begin to melt, such as shown in FIG. 6, the jackets 22,24 will begin to move axially which will in turn cause the melted bushing 26 to migrate or wipe against the outer jacket 24. During this axial movement, the biasing threshold force is generally or partially relieved. As this biasing force is reduced generally to or slightly below the loaded force of the loadable member 52, the steering column assembly 20 will begin to retract toward the retraced position. Upon this axial movement, the controller 68 will cause the heating fixture 60 to move radially outward and back into the pre-staged state spaced from the jackets 22,24. The bushing 26 is thus formed between the jackets 22, 24 with a consistent and reliable operational force during normal telescoping movement of the steering column assembly 20. The inner jacket 22 may be further stroked to a cold location on the outer jacket 24 to quench the melted pads 42 and arrest any thermal deformation.

In one embodiment, the jacket of the assembly 20 that is stationary in the vehicle during normal use is the jacket in direct contact with the melted pads 42 for consistent results. As described above, it is the outer jacket 24 that is stationary. However, one skilled in the art would now realize that if the inner jacket 22 were to be stationary, the pads 42 of the bushing 26 could project radially inward and directly contact the inner jacket 22. In this case, the heating fixture 60 may be located radially inward of the inner jacket 22 for melting of the pads 42.

The forms of the invention herein disclosed constitute exemplary embodiments, and many others are possible. It is not intended herein to mention all the possible equivalent forms or ramification of the invention. It is understood that terms used herein are merely descriptive, rather than limiting, and that various changes may be made without departing from the spirit or scope of the invention.

Having thus described the invention, it is claimed:

1. A steering column assembly comprising:
   an outer jacket,
   an inner jacket telescopingly disposed within said outer jacket for movement along a longitudinal axis between an extended position and a retracted position, with a cavity defined between said inner and outer jackets,
   a bushing radially disposed about said inner jacket within said cavity between said inner and outer jackets,
   said bushing including at least one tab engaging said inner jacket to interconnect said bushing to said inner jacket and including at least one radially projecting pad engaging said outer jacket to frictionally interconnect said bushing to said outer jacket for interlocking said inner and outer jackets and preventing axial movement between said inner and outer jackets, with said at least one radially projecting pad being melted after positioning between said inner and outer jackets to thermally size said bushing to create a predetermined biasing axial friction force between said inner and outer jackets to uniformly load said inner and outer jackets during multiple telescoping movements of the steering column assembly between the extended position and the retracted position.

2. A steering column assembly as set forth in claim 1, wherein said at least one radially projecting pad includes a plurality of pads.

3. A steering column assembly as set forth in claim 1, wherein said bushing includes an inner surface and an opposing outer surface with said tab projecting inwardly from said inner surface and said pad projecting outwardly from said outer surface.

4. A steering column assembly as set forth in claim 1, wherein said inner jacket includes a hole for accepting said tab of said bushing.

5. A steering column assembly as set forth in claim 1, wherein said bushing comprises a first end and a second end, and further includes a circumferential gap longitudinally extending through said bushing and splitting said bushing from said first end to said second end.

6. A steering column assembly as set forth in claim 5, wherein said circumferential gap is diametrically opposed to said at least one radially projecting pad.

7. A steering column assembly as set forth in claim 1, wherein said outer jacket includes an outer diameter and an inner diameter, said at least one radially projecting pad frictionally engaging said outer jacket inner diameter.

8. A steering column assembly as set forth in claim 1, wherein said bushing includes in inner diameter, said at least one tab extending radially from said inner diameter, wherein said bushing inner diameter is positioned directly against an outer diameter of said inner jacket.

9. A steering column assembly as set forth in claim 1, wherein a portion of said melted at least one radially projecting pad is wiped against said outer jacket.

10. A telescoping steering column assembly comprising:
    a first jacket;
    a second jacket telescopingly disposed within said outer jacket for movement along a longitudinal axis between a locked extended position and a locked retracted position; and
    a bushing radially disposed about said second jacket within a cavity defined between said first and second jackets, said bushing formed of a self-lubricating plastic material and comprising:
    at least one tab engaging said second jacket to interconnect said bushing to said second jacket; and
    at least one pad extending radially outward from said bushing, said at least one radially extending pad being melted after positioning between said first and second jackets to thermally size said bushing to create a predetermined biasing axial force between said first and second jackets to allow relative movement between said first and second jackets during multiple telescoping movements of the steering column assembly between the locked extended position and the locked retracted position.

* * * * *